United States Patent [19]

Mayer et al.

[11] 4,358,152

[45] Nov. 9, 1982

[54] FRONT END FOR A FORWARD CONTROL VEHICLE

[75] Inventors: Gustav Mayer; Gerhard Hinz; Herbert Muhs, all of Wolfsburg; Georg Sturmfels; Hartmut Bürger, both of Brunswick, all of Fed. Rep. of Germany

[73] Assignee: Volkswagenwerk Aktiengesellschaft, Wolfsburg, Fed. Rep. of Germany

[21] Appl. No.: 135,302

[22] Filed: Mar. 31, 1980

[30] Foreign Application Priority Data

May 5, 1979 [DE] Fed. Rep. of Germany ....... 2918136

[51] Int. Cl.³ .............................................. B62D 33/06
[52] U.S. Cl. .................................. 296/188; 180/89.1; 296/190
[58] Field of Search .................... 180/232, 89.1, 89.12, 180/89.13, 89.14, 89.15, 89.16; 296/188, 189, 190; 280/784; 293/115, 132

[56] References Cited

U.S. PATENT DOCUMENTS

| | | | |
|---|---|---|---|
| 2,173,408 | 9/1939 | Carta | 293/115 |
| 2,585,530 | 2/1952 | Bennett | 293/115 |
| 3,055,699 | 9/1962 | May | 296/190 |
| 3,746,383 | 7/1973 | Davis | 293/144 |
| 3,915,486 | 10/1975 | Maeda | 293/133 |

FOREIGN PATENT DOCUMENTS

| | | |
|---|---|---|
| 2612517 | 10/1976 | Fed. Rep. of Germany . |
| 2119847 | 3/1977 | Fed. Rep. of Germany . |
| 2225089 | 3/1977 | Fed. Rep. of Germany . |
| 2705849 | 8/1978 | Fed. Rep. of Germany . |

OTHER PUBLICATIONS

Aktive und Passive Sicherheit eines Frontienkerfahrzeugs, Automobiltechnische Zeitschrift, Jun. 1973, pp. 197-202.

Primary Examiner—John A. Pekar
Attorney, Agent, or Firm—Brumbaugh, Graves, Donohue & Raymond

[57] ABSTRACT

The front end of a forward control vehicle is provided with a rigid bottom cross member supported on the front end of longitudinal members of the vehicle frame and bridging the separation between the two frame A columns. In order to guard against crushing of the passenger compartment during a head-on collision, a rigid upper cross member is provided at a distance above the bottom cross member at a position behind the front panel plate of the vehicle. The upper cross member also extends between the A columns and is connected to them in a force-transmitting manner. At least one diagonal tie at a location distant from the two A columns connects the upper and lower cross members so as to transmit force between them.

10 Claims, 2 Drawing Figures

FRONT END FOR A FORWARD CONTROL VEHICLE

BACKGROUND OF THE INVENTION

The present invention concerns the front end frame construction of a forward control vehicle and, more particularly, a front end designed to reduce injuries to passengers in such vehicles.

In forward control vehicles, in which the passenger compartment is above the engine compartment in the immediate front end of the vehicle, it may be difficult to maintain sufficient space to permit the survival of the driver and the front seat passenger during a head-on collision. This problem arises because, in contrast to a passenger car with a front end designed to accommodate the driving unit or a luggage compartment, not many structures offering protection are available in the front of a forward control vehicle.

The provision of a bending-resistant bottom cross member in a front control vehicle is known. Such a cross member is arranged behind the bumper and is designed as a deformation element to which the front panel plate of the vehicle is fixed. The deformation element described becomes fully effective if during a collision of the vehicle the forces are introduced directly into the deformation element, i.e. when the bumper in front of the deformation element comes in contact with the obstacle. However, in many collisions this is not the case, at least during the first phase of the impact. For example, when there is an impact on the rear of a truck, contact with the truck occurs in a higher region so that the bottom cross member is ineffective and the front panel plate is substantially deformed into the passenger compartment, possibly after coming loose from the bottom cross member.

German published patent application No. 22 25 089, B62d 25/08, discloses an automobile body with a front bumper that is supplemented so as to form a frame extending perpendicular to its plane, which frame bears against the front ends of longitudinal members of the body. In the front end of a forward control vehicle, as has been shown, conditions prevail which are different from those of a passenger car and therefore the frame construction of this German application are not applicable. Further, the cross member forming the upper part of the frame is relatively easily bent or folded backward during a collision with an obstacle.

A forward control vehicle in accordance with German Letters of Disclosure 27 05 849, B62d 25/08 has a fold-back cover for a spare tire space provided in the center zone of the front panel. The bumper and the apron form one piece composed of integral foam, and are fixed as a flap by means of a hinge pin on a cross member of the vehicle. Behind the part composed of integral foam there is a carrying frame that likewise forms a component of the flap, which carrying frame bears against the bumper by way of horizontally extending struts.

SUMMARY OF THE INVENTION

It is the object of the present invention to render the front end of a forward control or cab-on-engine vehicle in such a manner that in case of a collision of the type in which an obstacle "runs over" or "rides over" a rigid bottom cross member of the front end, the protection of the passengers is improved relative to the state of the art. It is a further object that this improved protection be obtained by means of devices which do not protrude beyond the front panel plate and do not require an uneven design thereof, thus avoiding an arrangement that would constitute a disadvantage in the case of a collision with a pedestrian, as well as a disadvantage with respect to air resistance. The attainment of these objects in accordance with the invention is achieved by connecting a rigid upper member between the two frame A columns of the vehicle at a distance above the bottom cross member, and by connecting the upper and bottom cross members together within diagonal ties.

In an illustrative embodiment of the invention a forward control vehicle is provided with a front end in which its bottom cross member is supported on the front ends of longitudinal frame members and extends between the two A columns of the vehicle frame. In order to protect the passenger compartment during collisions in which the obstacle rides over the bottom cross member, an upper cross member is provided above the bottom cross member and is arranged so that it also extends between the A columns. Diagonal ties spaced from the A columns may connect the upper and bottom cross members, thus forming what may be described as a fence-like front frame constructions. The number of diagonal ties, which constitute the "pickets" of the fence-like construction, as it were, will depend upon the individual case concerned. The diagonal ties are arranged such that in an accident, e.g., in case of a collision within a particular speed range involving the rear of a truck, the upper cross member will be bent, if at all, in an upward arc and backwards only slightly. Thus, the cross members and the ties absorb substantial energy before the upper cross member can be pushed into the passenger compartment.

Tests have shown that due to the extension-resistant linking of the upper cross member with the bending-resistant bottom cross member via the diagonal ties, which bottom member is possibly designed in a manner known per se as a deformation element, and the force-transmitting connection of the upper cross member with the two A columns, there is created a front frame construction which is optimally resistant considering the space conditions present in a front control vehicle. During a collision this construction also braces the front panel plate, thereby relieving the stress in the connection between the panel plate and the bottom cross member, even in collisions in which the contact with the obstacle occurs above the bottom cross member. This construction has the further advantages that it (a) introduces impact forces into the cross members and into the longitudinal members, (b) offers freedom with respect to the design of the front panel proper from the point of view of style, aerodynamics or the protection of pedestrians, and (c) is simple to execute.

BRIEF DESCRIPTION OF THE DRAWING

The invention is explained in the following description of two exemplary embodiments with reference to FIGS. 1 and 2 which show in perspective only those parts of the front end of a forward control vehicle necessary to describe the invention.

DESCRIPTION OF TWO EXEMPLARY EMBODIMENTS

Figure 1:
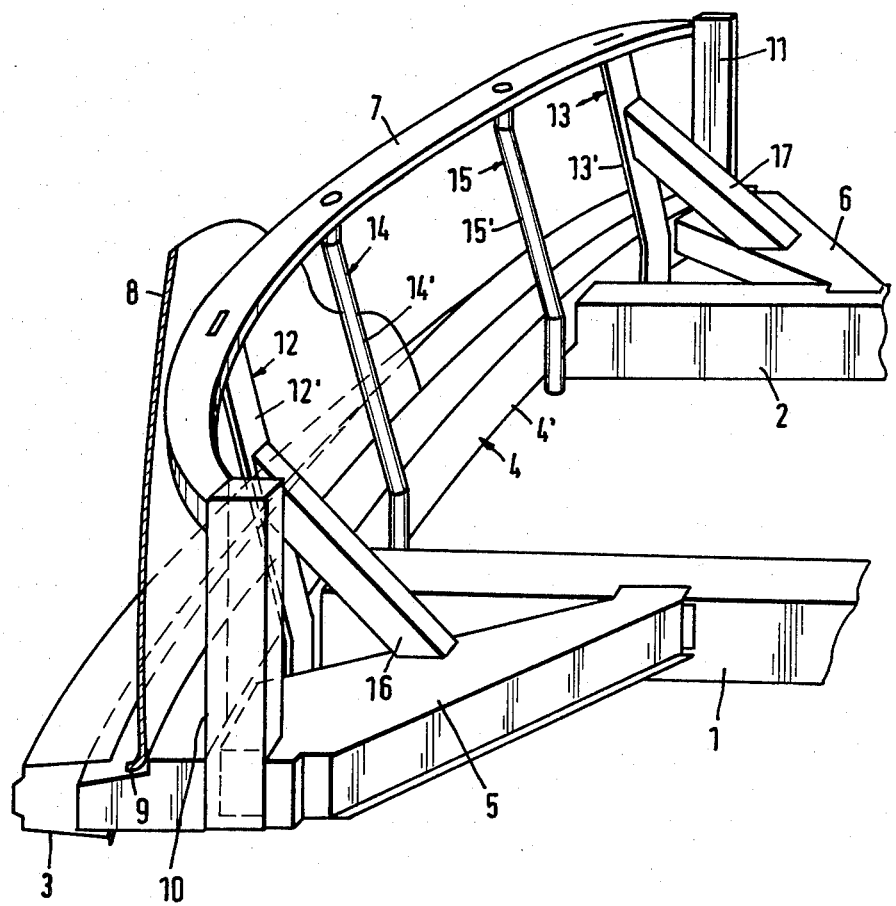

Looking first at FIG. 1, as is customary, the vehicle has a left longitudinal member 1 and a right longitudinal member 2. The front ends of the longitudinal members 1 and 2 are bridged, likewise as known, by a bottom bending-resistant cross member 4, which is arranged behind a bumper 3 and is designed as a deformation element. The lateral portions of the bottom cross member 4 that extend beyond the longitudinal members 1 and 2 are supported by way of lateral extensions 5 and 6 provided on each longitudinal member 1 and 2, respectively.

At a distance above the bottom cross member 4 extends a further upper bending-resistant cross member 7. The upper cross member, in a manner to be described below, is in force transmitting connection with the remainder of the vehicle frame and supports a front panel plate 8. Front panel plate 8, in a manner known per se, is connected with its bottom end 9 to the bottom cross member 4 and is braced by the upper cross member 7 during a collision with an obstacle which is on a higher level than the bottom cross member 4 and the bumper 3, e.g., a collision with the rear of a truck.

FIG. 1 shows that the upper cross member 7 is somewhat bowed forward, i.e. it is forward-curving, and bears with its ends on the two A columns 10 and 11 of the vehicle so that only over this path can forces be introduced into the remainder of the vehicle framework during a collision. In order to protect the upper cross member 7 from bending backward in its middle part, i.e. to the right as shown in the figure, there are provided in this example two outer diagonal ties 12 and 13 with a flat cross-sectional profile and two inner hollow diagonal ties 14 and 15 with a round or square cross-sectional profile. These ties extend from the upper cross member 7 to the lower cross member 4 so as to constitute force-transmitting connections between them. The arrangement composed of the bottom cross member 4, the upper cross member 7 and the diagonal ties 12 to 15 forms, as it were, a fence.

Whereas the diagonal ties 12 to 15 act on a vertical rear wall 4' of the bottom cross member 4, they pass vertically upward through the center of the upper cross member 7 at positions slightly forward of wall 4'. Therefore, the diagonal ties must have middle zones 12', 13', 14' and 15' which are obliquely inclined forward. These middle zones bring about an additional stiffening against deformation of the upper cross member 7 into the passenger compartment during the initial absorption of the impact forces by the upper cross member.

The two outer diagonal ties 12 and 13 extend approximately in the zone of the two longitudinal members 1 and 2 and are supported by way of supporting webs 16 and 17 on the lateral extensions 5 and 6.

The perpendicular distance between the upper cross member 7, on the one hand, and the bottom cross member 4, on the other hand, will suitably depend upon the structural specifics of the vehicle concerned (e.g., the level of the bottom edge of the windshield). The number and shape of the diagonal ties will likewise depend upon the type of utilization envisioned.

Figure 2:
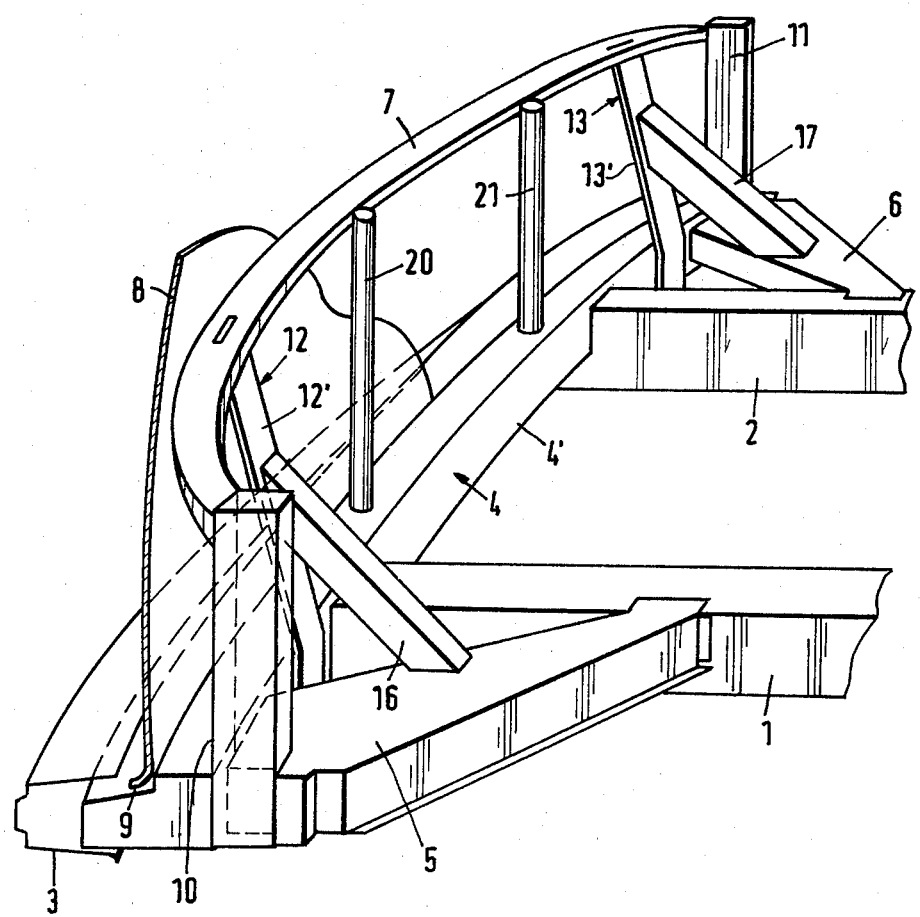

In the example shown in FIG. 2 the two inner diagonal ties 20 and 21 extend from the rear wall of the upper cross member 7 towards the upper wall of the bottom cross member 4 penetrating said bottom cross member. This embodiment has the same effect, i.e. it prevents the upper cross member 7 from being forced backwards in case of an accident.

We claim:

1. In a front end construction for a forward control vehicle with a front panel plate and a rigid bottom cross member supported behind the front panel plate on the front ends of longitudinal members, which the bottom cross member bridges the separation between two A columns of the vehicle, the improvement characterized in that an upper rigid cross member is positioned at a distance above the bottom cross member and behind the front panel plate, said upper member bridges the separation between the two A columns and is connected therewith in a force-transmitting manner; and at least one tie member which connects the upper cross member in a force-transmitting manner with the bottom cross member at a location distant from the two A columns.

2. A front end as claimed in claim 1 characterized in that the tie member extends in the vicinity of one of the longitudinal members and a support web connects said tie member to said one longitudinal member in a force-transmitting manner.

3. A front end as claimed in claim 2, characterized in that the longitudinal members have lateral extension members and a support web connects said tie member to the pertaining lateral extension member in a force-transmitting manner.

4. A front end as claimed in claims 1, 2 or 3, characterized in that the upper cross member is bowed toward the front of the vehicle.

5. A front end as claimed in claim 1, characterized in that the tie member is attached to a rear wall of the bottom cross member and to a bottom wall of the upper cross member at a position forward of the rear wall of the bottom cross member, and within the region separating the two cross members the tie member has a zone directed forwardly at an inclination.

6. A front end as claimed in claim 1, characterized in that the tie member is attached to a rear wall of the upper cross member and to an upper wall of the bottom cross member.

7. A front end as claimed in claim 1, characterized in that the tie member is hollow and has a round cross-sectional profile.

8. A front end as claimed in claim 1, characterized in that the tie member is hollow and has a square cross-sectional profile.

9. A front end as claimed in claim 1, characterized in that the tie member has a flat cross-sectional profile.

10. A front end as claimed in claims 1, 2, 3, 5, 6, 7, 8, or 9, characterized in that said at least one tie member comprises at least two outer tie members with flat cross-sectional profiles that extend in the vicinity of the respective longitudinal members and at least one inner hollow tie member arranged at a point between the two outer tie members; and support webs connect the respective longitudinal members and outer tie members in a force-transmitting manner.

* * * * *